(12) United States Patent
Williams

(10) Patent No.: US 7,490,942 B2
(45) Date of Patent: Feb. 17, 2009

(54) PROJECTOR WITH AUTOMATIC FOCUSING ASSISTANCE

(75) Inventor: David A. Williams, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 19 days.

(21) Appl. No.: 10/997,346

(22) Filed: Nov. 23, 2004

(65) Prior Publication Data

US 2006/0109426 A1    May 25, 2006

(51) Int. Cl.
*G03B 21/14*    (2006.01)
(52) U.S. Cl. ..................... 353/101; 353/122
(58) Field of Classification Search ........... 353/119, 353/101, 69
See application file for complete search history.

(56) References Cited

U.S. PATENT DOCUMENTS

| | | | |
|---|---|---|---|
| 3,709,609 A | | 1/1973 | Spengler et al. |
| 4,124,285 A | * | 11/1978 | Johnson et al. ............ 353/28 |
| 4,426,726 A | | 1/1984 | Cheetham |
| 4,647,208 A | | 3/1987 | Bieman |
| 4,794,430 A | | 12/1988 | Whittaker et al. |
| 4,820,161 A | | 4/1989 | Wescott |
| 4,895,448 A | | 1/1990 | Laird |
| 5,181,323 A | | 1/1993 | Cooper |
| 6,034,764 A | | 3/2000 | Carter |
| 6,050,690 A | * | 4/2000 | Shaffer et al. ............ 353/122 |
| 6,113,240 A | * | 9/2000 | Iizuka ...................... 353/31 |
| 6,483,555 B1 | | 11/2002 | Thielemans et al. |
| 6,592,228 B1 | * | 7/2003 | Kawashima et al. ........ 353/101 |
| 6,935,754 B2 | * | 8/2005 | Salvatori et al. ............ 353/119 |
| 7,165,849 B2 | * | 1/2007 | Masuzawa et al. .......... 353/101 |
| 2001/0017604 A1 | | 8/2001 | Jacobsen et al. |
| 2002/0113946 A1 | * | 8/2002 | Kitaguchi et al. ............ 353/28 |
| 2003/0038822 A1 | | 2/2003 | Raskar |
| 2003/0223109 A1 | * | 12/2003 | Deverin et al. ............ 359/389 |
| 2004/0021836 A1 | | 2/2004 | Hamada |
| 2005/0046804 A1 | * | 3/2005 | Akutsu ..................... 353/70 |
| 2005/0062939 A1 | * | 3/2005 | Tamura ..................... 353/69 |
| 2005/0099609 A1 | * | 5/2005 | Masuzawa et al. .......... 353/101 |
| 2005/0124387 A1 | * | 6/2005 | Ribeiro et al. ............ 455/566 |
| 2006/0097992 A1 | * | 5/2006 | Gitzinger et al. ........... 345/173 |

FOREIGN PATENT DOCUMENTS

| | | |
|---|---|---|
| JP | 2000-040651 | 9/2000 |
| JP | 2001-083600 | 7/2001 |
| KR | 2003-037714 | 5/2003 |
| KR | 2003037714 | * 5/2003 |

OTHER PUBLICATIONS

Derwent 2003-694445 (partial translation of Korean patent publication KR 2003037714).*
English translation of KR 2003037714.*

* cited by examiner

*Primary Examiner*—William C. Dowling

(57) ABSTRACT

A projector with automatic focusing assistance includes a focus control for controlling the focus of optics of the projector, and a focus control use sensor. The projector automatically displays a focus assistance element when the focus control use sensor detects use of the focus control. A method of operating a projector includes automatically displaying a focus assistance element when a focus control of the projector is used.

39 Claims, 6 Drawing Sheets

PROJECTOR WITH AUTOMATIC FOCUSING ASSISTANCE

BACKGROUND

Video projection systems are widely used in a variety of applications. For example, video projection systems, both forward and rear projection systems, are widely used in "big screen" home entertainment systems to provide a much larger picture than is economically available using a conventional cathode ray tube. Additionally, video projection systems may be used in a theater to display a movie or other video program, or still pictures for a relatively large audience.

Video projection systems are also used in business, education, training and other areas to display presentations such as, pictures, graphs, charts, outlines, etc., for a number of people to view. In one such example, video projection can make it possible for a relatively large number of people to observe a computer desktop and the work being done by an operator of the computer. Because video projection systems are so widely used, there is a constant desire to improve on known video projection systems.

Many such projection systems are now made as portable projector units that can be taken and deployed wherever needed. However, with such a portable projector, it is necessary to focus the projector each time it is deployed in a new environment.

Unfortunately, most people have difficulty focusing a projector, particularly if the image being displayed is a photo image with no clear edges or lines. Some users have to get extremely close to the projected image or display an image with sharp lines or text to be able to accurately focus the projector.

SUMMARY

A projector with automatic focusing assistance includes a focus control for controlling the focus of optics of the projector, and a focus control use sensor. The projector automatically displays a focus assistance element when the focus control use sensor detects use of the focus control. A method of operating a projector includes automatically displaying a focus assistance element when a focus control of the projector is used.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

As mentioned above, many people have difficulty focusing a projector. It is easiest to focus a projector if there are elements in the projected image that have sharp lines or edges, or if there is text in the image. It is much easier to visually determine whether such elements are in or out of focus. Consequently, the present specification describes systems and methods in which a projector automatically inserts crosshairs or other visual elements into a projected image when a focusing control is being operated so that the user can more readily bring the image into focus.

As used herein and in the appended claims, the term "projector" will broadly refer to any device that projects an image onto a screen or other projection display surface. A projector may be, for example, a liquid crystal projector, a digital micro-mirror projector, etc.

Figure 1:
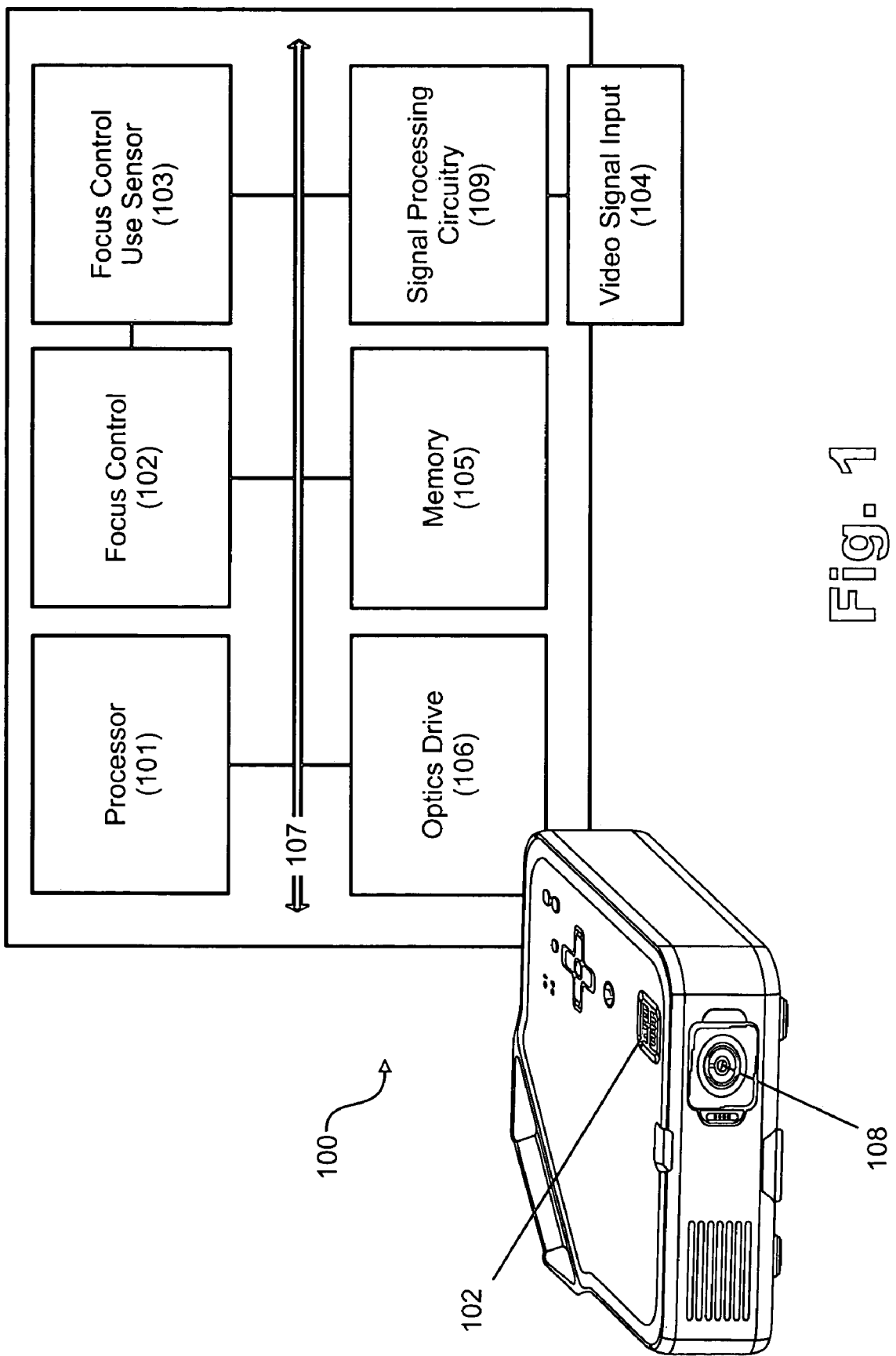
FIG. 1 is an illustration of an exemplary projector according to principles described herein.

FIG. 1 is an illustration of an exemplary projector according to principles described herein. The projector (100) is used to project images onto a screen or other projection display surface.

As shown in FIG. 1, the projector (100) includes a video signal input (104) through which the projector receives an electronic image signal that is used to produce the image(s) projected. As used herein and in the appended claims, the term "image" will be understood to broadly refer to any and all images that can be displayed by the projector including still images, a sequence of still images or motion picture video.

The image signal received by the video signal input (104) is processed by signal processing circuitry (109). The processed signal is then used to produce the image projected by the projector. The optics of the projector, which will be described in more detail below, use the processed image signal to visually produce and project the desired image.

The optics (108) of the projector include, for example, at least one lens, a projection lamp for generating a projection light beam and a modulator for generating the image that is projected by the projector. The projection light beam is then, for example, shown through or reflected from the modulator to project the image formed on the modulator.

One or more of the elements of the projector optics (108) will also be moveable with respect to other optic elements to focus the image projected by the projector. An optics drive (106) is a mechanical drive that moves one or more elements of the projector optics (108) to adjust the focus of the projector (100). The optics drive (106) may be electrically or mechanically controlled.

The optics drive (106) is controlled with a focus control (102), which is part of the user interface and user input devices of the projector (100). With this control (102), the user can cause the optics drive (106) to change the focus of the optics (108) of the projector (100). The focus control (102) may be, for example, a dial or knob, a button or buttons, a rocker switch, etc.

A processor (101) coordinates and controls the operation of the projector (100). A memory (105) stores the firmware or programming executed by the processor (101). A system bus (107) interconnects the internal elements of the projector (100).

With the focus control (102), is a focus control use sensor (103). This sensor (103) will detect when the focus control (102) is or is about to be used. In some examples, the focus control use sensor (103) detects actual movement or actuation of the focus control (102). The movement detected will depend on the form of the focus control (102). For example, if the focus control (102) is a button or rocker switch, the focus control use sensor (103) will detect depression or activation of the button or rocker switch. If the focus control (102) is, instead, a dial or knob, the focus control use sensor (103) will detect rotation or twisting of the dial or knob.

In other examples, the focus control use sensor (103) may detect when a human user is touching the focus control, presumably for the purpose of adjusting the focus. In such examples, the focus control use sensor (103) may include a capacitance sensor which detects a change in capacitance that results from the human user placing his or her fingers in contact with the focus control (102).

In either case, the focus control use sensor (103) detects the use or impending use of the focus control (102) and signals the processor (101). The processor (101) will respond by changing the image projected by the projector (100) to include a focus assistance element. The focus assistance element has one or more sharp lines or edges which a user can readily determine to be in or out of focus. In some examples, the focus assistance element is text. In other examples, the focus assistance element is a set of crosshairs. The focus assistance element may be a combination of any such elements.

The focus assistance element can be superimposed on the image then being projected by the projector (100) or can temporarily replace the image being projected as received through the video signal input (104). The focus assistance element can be displayed whenever, and for as long as, the user is touching the focus control (102) or may be displayed as soon as, and during, the time the focus control (102) is operated. The focus assistance element may also remain in the display for a predetermined period of time after the user has stopped actuating or touching the focus control (102) so that proper focus of the projector (100) can be visually verified.

When no longer needed, the focus assistance element is automatically removed from the display of the projector (100), as it automatically appeared. The displayed image then returns to the image being fed to the projector (100) through the video signal input (104) or other signal source.

Figure 2:
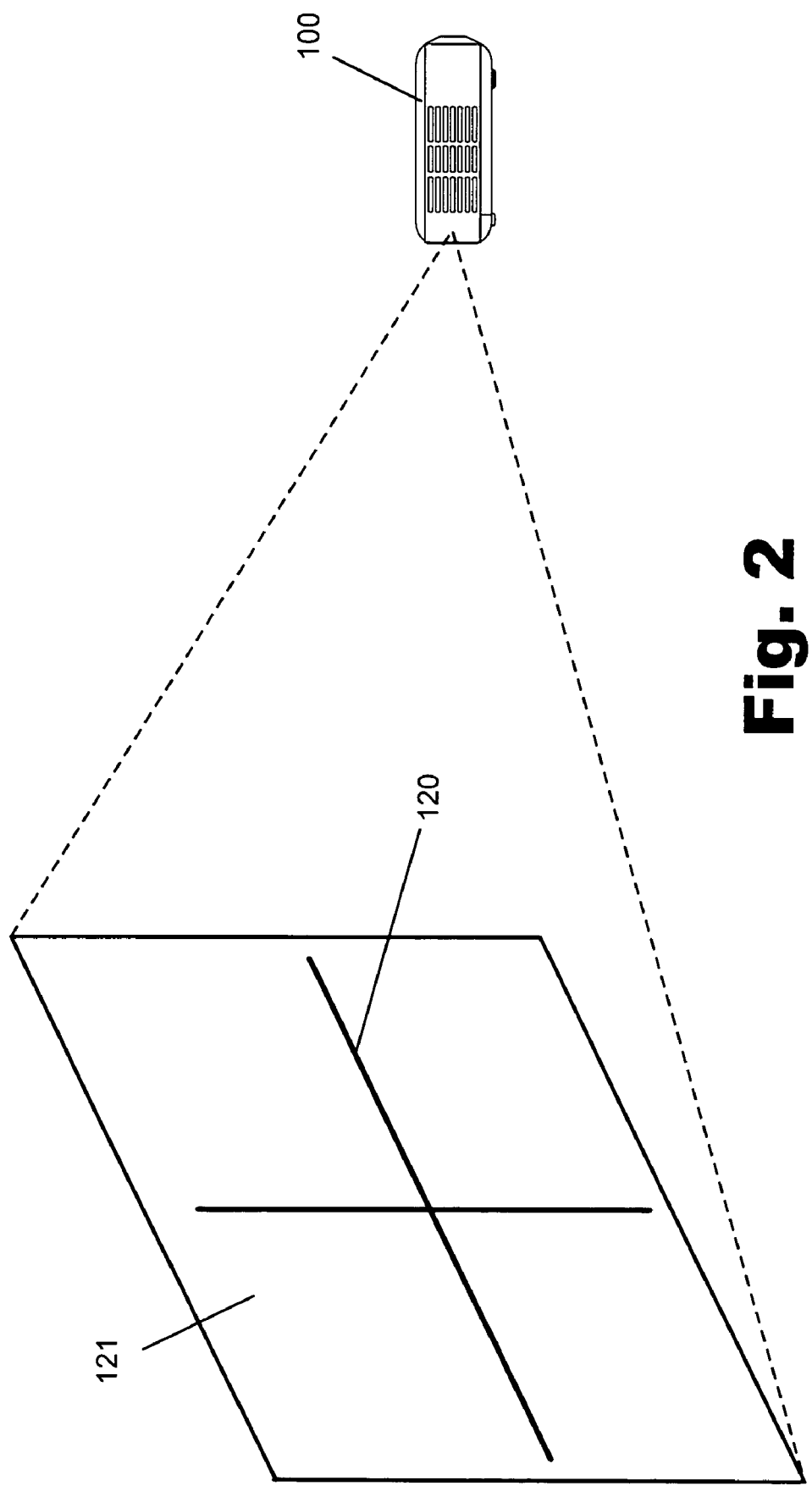
FIG. 2 is an illustration of the operation of an exemplary projector, such as the projector of FIG. 1.

FIG. 2 is an illustration of the operation of an exemplary projector, such as the projector of FIG. 1. As shown in FIG. 2, the projector (100) projects an image (121) onto a screen or other projection display surface.

As also shown in FIG. 2, the focus assistance element is automatically displayed and projected when a user is focusing the projector (100). In the illustrated example, the focus assistance element is a set of crosshairs (120).

With the crosshairs or other focus assistance element displayed, most human users can more readily determined if the image projected by the projector (100) is in or out of focus. The focus of the projector (100) is then adjusted while the focus assistance element (120) is displayed, until the user decides that the image is in focus.

The focus assistance element then automatically disappears, immediately or after a predetermined time. The projector (100) then projects the image or images desired which are in focus or in better focus as a result of the user having focused the projector (100) using the focus assistance element.

Figure 3:
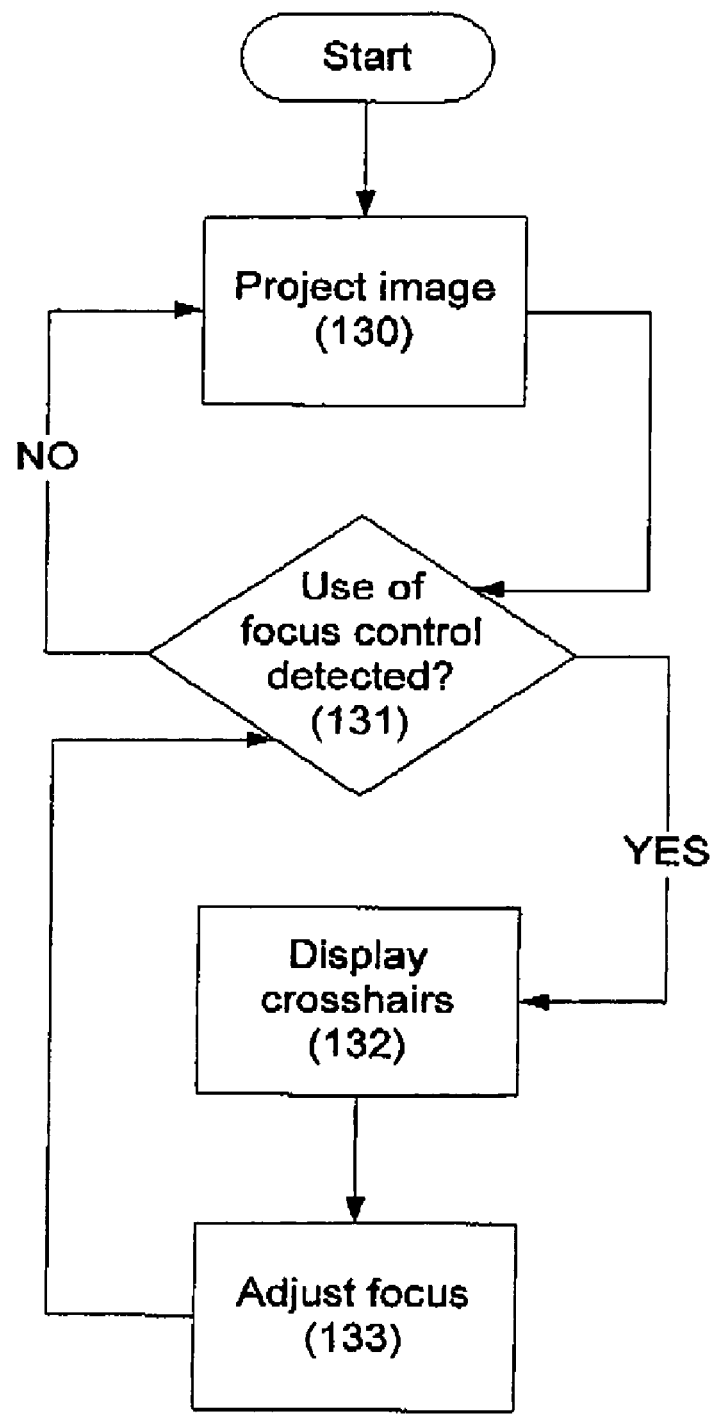
FIG. 3 is a flowchart illustrating the operation of an exemplary projector, such as the projector of FIG. 1.

FIG. 3 is a flowchart illustrating the operation of an exemplary projector, such as the projector of FIG. 1. As shown in FIG. 3, the method begins with an image being projected (step 130). This image is typically the image being fed to the projector though the video signal input (104, FIG. 1).

As described above, the projector described herein is capable of detecting when a user wants to operate the focus control (102, FIG. 1) to adjust the focus of the projector. If the use of the focus control is detected (determination 131), the crosshairs or other focus assistance element is displayed (step 132). This display may overlay the currently displayed image or temporarily replace the previously displayed image.

With the focus assistance element displayed, the user can adjust the focus of the projector (step 133) to better focus the displayed image. The focus assistance element will then, in some embodiments, automatically disappear immediately, or some predetermined time after, the use of the focus control ceases.

Figure 4:
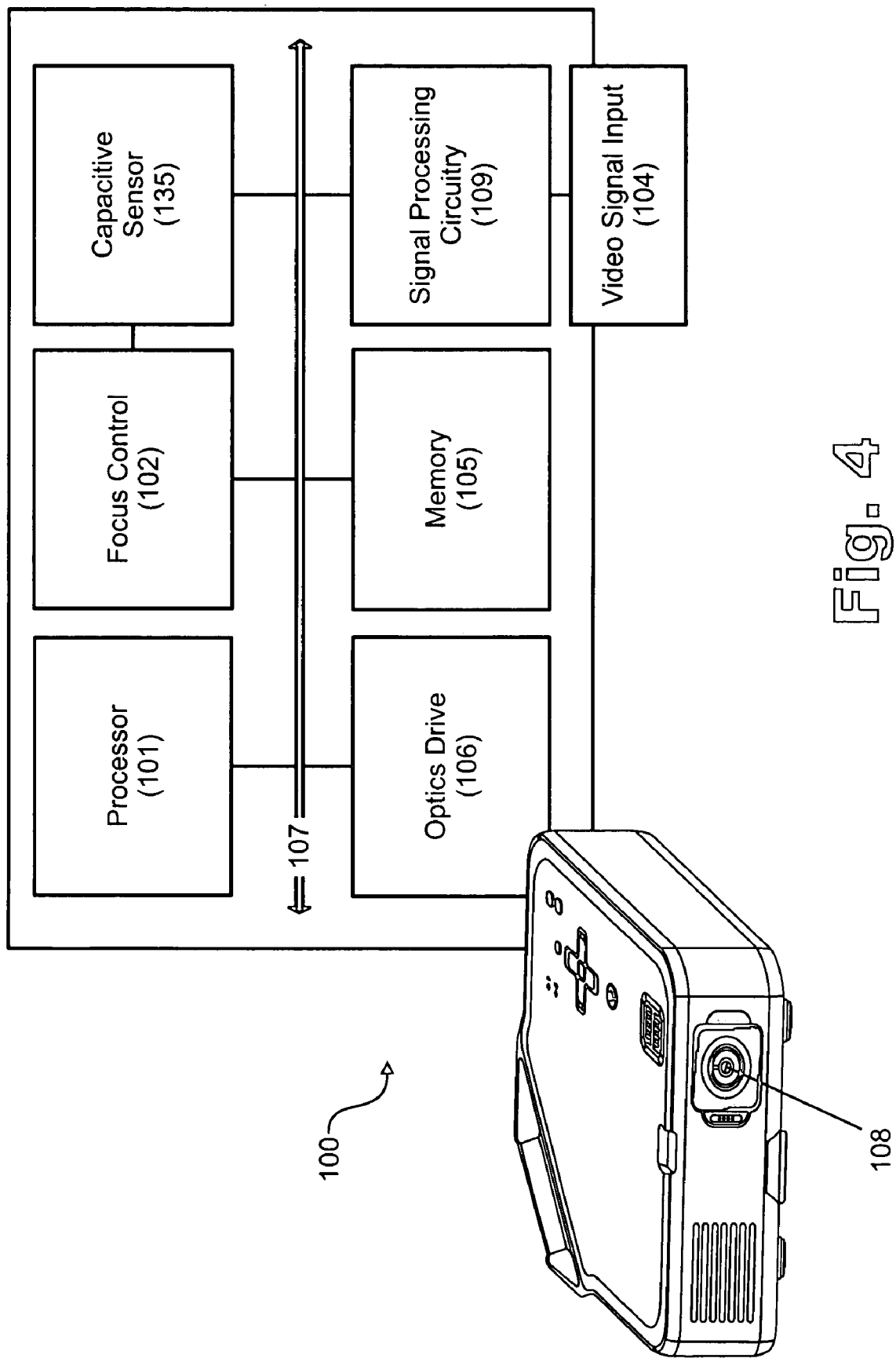
FIG. 4 is an illustration of another exemplary projector according to principles described herein.

FIG. 4 is an illustration of another exemplary projector according to principles described herein. As shown in FIG. 4, and as mentioned above, the focus control use sensor may be, or include, a capacitive sensor (135). The capacitive sensor (135) will detect a change in capacitance at the focus control (102) that results from a human user placing his or her fingers in contact with the focus control (102).

Thus, as soon as a user touches the focus control (102), the projector (100) can determine that the user desires to adjust the focus. The processor (101) will then display the focus assistance element to assist the user in properly focusing the projector (100). The focus assistance element may be displayed as long as the user is touching the focus control (102).

The display of the focus assistance element may be discontinued immediately when the capacitive sensor (135) detects that the user has released or stopped touching the focus control (102). In other embodiments, the focus assistance element may continue to be displayed for a predetermined period of time, for example, several seconds, so that proper focus of the projector can be verified.

Figure 5:
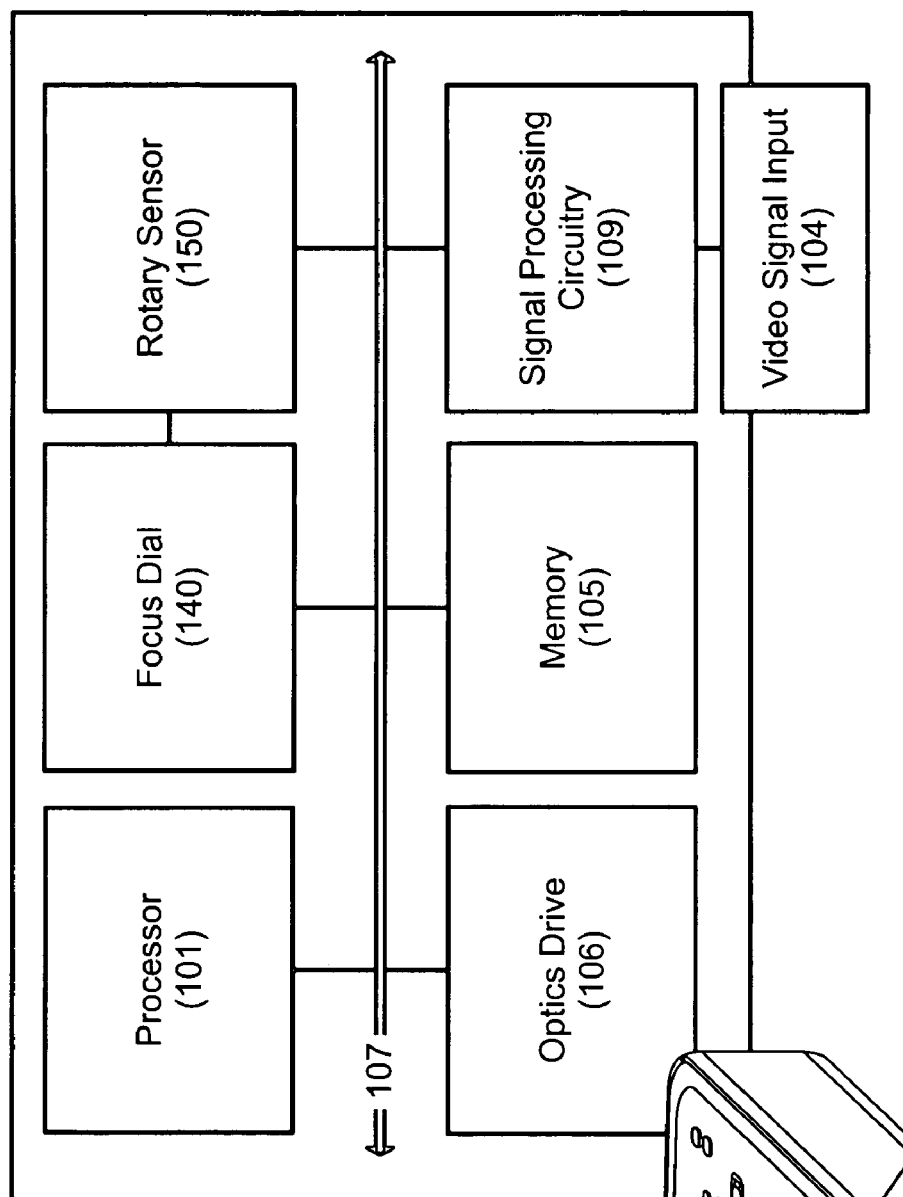
FIG. 5 is an illustration of another exemplary projector having a focusing dial according to principles described herein.

FIG. 5 is an illustration of another exemplary projector having a focusing dial according to principles described herein. As shown in FIG. 5, the focusing control of the projector (100) is a focusing dial or knob (140). The focus control use sensor is, or includes, a rotary sensor (150).

The rotary sensor (150) may be, for example, an optical or mechanical encoder or some other rotary sensor that detects rotation or movement of the focus dial (140). When movement of the dial (140) is detected, the sensor (150) signals the processor (101) to project the focus assistance element, either alone or superimposed over the existing display. The user can then adjust the focus of the projector using the displayed focus assistance element. The focus assistance element may continue to be displayed for a predetermined period of time, for example, several seconds, after the last movement of the dial (140) is detected so that proper focus of the projector can be verified.

Figure 6:
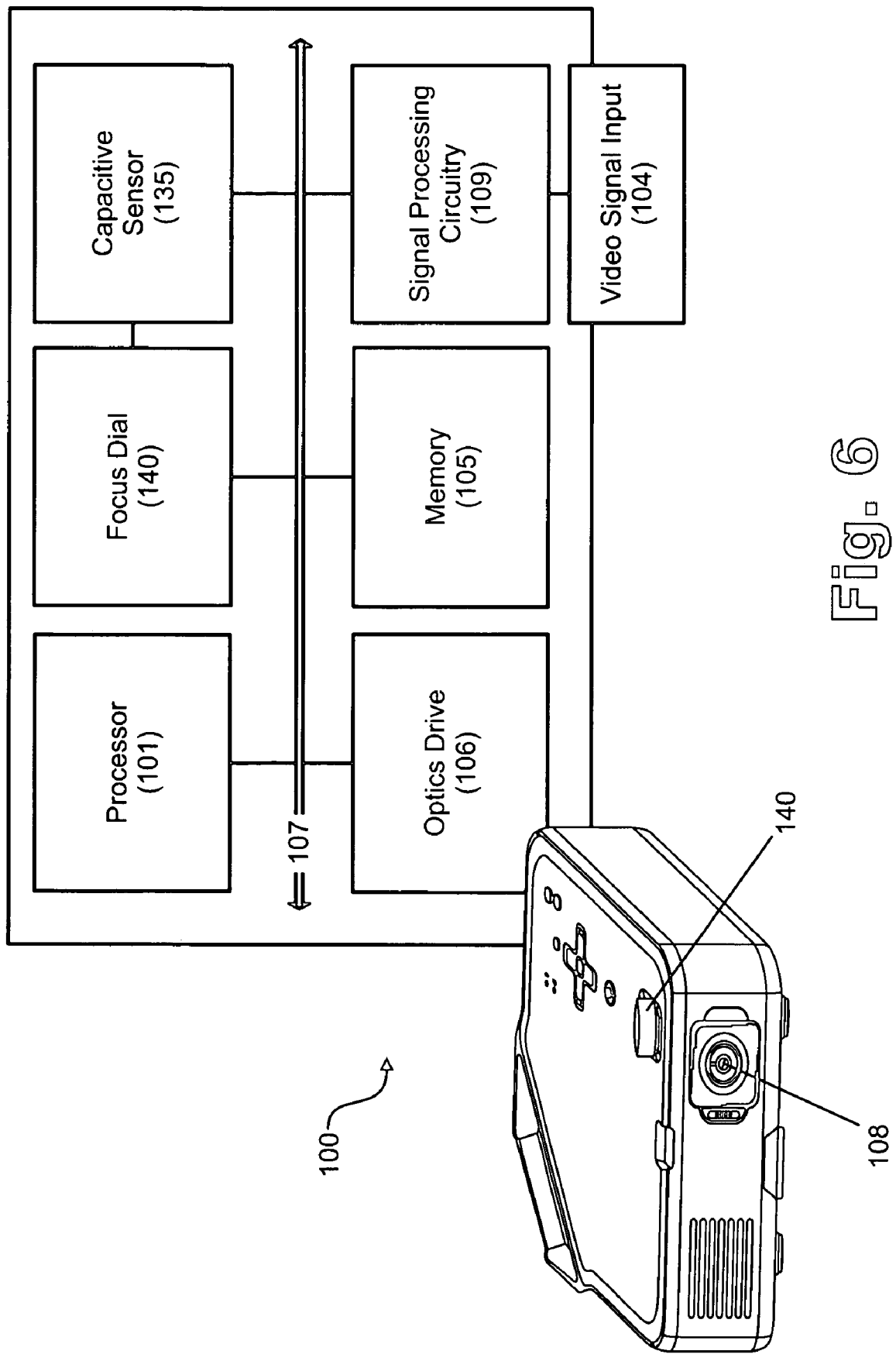
FIG. 6 is an illustration of another exemplary projector having a focusing dial according to principles described herein.

FIG. 6 is an illustration of another exemplary projector having a focusing dial according to principles described herein. As shown in FIG. 6, the focusing control of the projector (100) is a focusing dial (140). However, the focus control use sensor is, or includes, a capacitive sensor (135). As described above, the capacitive sensor (135) will detect a change in capacitance at the focus control dial (140) that results from a human user placing his or her fingers in contact with the dial (140).

Thus, as soon as a user touches the dial (140), the projector (100) can determine that the user desires to adjust the focus. The processor (101) will then display the focus assistance element to assist the user in properly focusing the projector (100). The focus assistance element may be displayed as long as the user is touching the focus control (102). The focus assistance element may be discontinued immediately when the capacitive sensor (135) detects that the user has released or stopped touching the focus control (102). In other embodiments, the focus assistance element may continue to be displayed for a predetermined period of time, for example, several seconds, so that proper focus of the projector can be verified.

Retuning to FIG. 1, and in the illustrated embodiments generally, the focus control (102) is connected to the bus (107) and electronically signals the optics drive (106) to control the focus of the optics (108) of the projector (100). However, in some embodiments, the focus control (102) may be mechanically coupled to and may, itself, mechanically drive the optics of the projector (100).

As described, some examples of the projector described herein employ a capacitive sensor to determine when a user is touching the focus control. Other examples employ a sensor that detects when a focus control is moved or actuated. Some examples may include both a capacitive or other touch sensor and a sensor that detects when the focus control is moved or actuated.

The preceding description has been presented only to illustrate and describe embodiments of the invention. It is not intended to be exhaustive or to limit the invention to any precise form disclosed. Many modifications and variations are possible in light of the above teaching. It is intended that the scope of the invention be defined by the following claims.

What is claimed is:

1. A projector with automatic focusing assistance comprising:
   a focus control for manually controlling a focus of optics of said projector; and
   a focus control use sensor configured to sense any contact between a human user's hand and said focus control;
   wherein said projector automatically displays a focus assistance element when said focus control use sensor detects any contact between said focus control and said user's hand.

2. The projector of claim 1, wherein said focus control comprises a dial.

3. The projector of claim 2, wherein said focus control use sensor comprises a rotary sensor.

4. The projector of claim 1, wherein said focus control comprises buttons.

5. The projector of claim 1, wherein said focus control comprises a rocker switch.

6. The projector of claim 1, wherein said focus control use sensor comprises a capacitive sensor configured to detect said contact between said focus control and said user's hand.

7. The projector of claim 1, wherein said focus assistance element comprises crosshairs.

8. The projector of claim 1, wherein said focus assistance element comprises text.

9. The projector of claim 1, wherein said focus assistance element is superimposed on a currently projected image.

10. The projector of claim 1, wherein said focus assistance element temporarily replaces a projected image.

11. The projector of claim 1, further comprising a processor that receives an output from said focus control use sensor and, in response, selectively displays said focus assistance element.

12. The projector of claim 1, wherein said projector automatically discontinues display of said focus assistance element when said focus control is no longer in use.

13. The projector of claim 12, wherein said projector automatically discontinues display of said focus assistance element a predetermined time after use of said focus control ceases.

14. A method of operating a projector comprising:
   detecting physical contact between a manual focus control of said projector and a human user's hand indicating use of said focus control; and
   automatically displaying a focus assistance element upon detection of said physical contact between a manual focus control of said projector and said user's hand without waiting for said manual focus control to be actuated.

15. The method of claim 14, further comprising detecting a change in capacitance at said focus control to determine use of said focus control.

16. The method of claim 14, wherein said focus control comprises a dial and said method further comprises detecting rotation of said dial to determine use of said focus control.

17. The method of claim 14, wherein said focus control comprises a rocker switch.

18. The method of claim 14, wherein said focus assistance element comprises crosshairs.

19. The method of claim 14, wherein said focus assistance element comprises text.

20. The method of claim 14, further comprising superimposing said focus assistance element on a currently projected image.

21. The method of claim 14, further comprising temporarily replacing a currently projected image with said focus assistance element.

22. The method of claim 14, further comprising automatically discontinuing display of said focus assistance element when said focus control is no longer in use.

23. The method of claim 14, further automatically discontinuing display of said focus assistance element a predetermined time after use of said focus control ceases.

24. A method of operating a projector comprising automatically displaying a focus assistance element as soon as a manual focus control of said projector is touched.

25. The method of claim 24, further comprising detecting a change in capacitance at said focus control to determine use of said focus control.

26. The method of claim 24, wherein said focus assistance element comprises crosshairs.

27. The method of claim 24, wherein said focus assistance element comprises text.

28. The method of claim 24, further comprising superimposing said focus assistance element on a currently projected image.

29. The method of claim 24, further comprising temporarily replacing a currently projected image with said focus assistance element.

30. The method of claim 24, further comprising automatically discontinuing display of said focus assistance element when said focus control is no longer in use.

31. The method of claim 24, further automatically discontinuing display of said focus assistance element a predetermined time after use of said focus control ceases.

32. A projector with automatic focusing assistance comprising:
   means for manually controlling a focus of optics of said projector;
   means for sensing use of said means for controlling focus, wherein said use is determined by physical contact between said means for manually controlling a focus and a human user's hand; and
   means for automatically displaying a focus assistance element when said physical contact is sensed and before said focus is manually adjusted by a user.

33. The projector of claim 32, wherein said means for controlling comprise a dial.

34. The projector of claim 33, wherein said means for sensing comprises a rotary sensor.

35. The projector of claim 32, wherein said means for sensing comprise a capacitive sensor.

36. The projector of claim 32, wherein said focus assistance element comprises crosshairs.

37. The projector of claim 32, wherein said use of said means for controlling is determined exclusively by sensing said physical contact between said means for manually controlling and said user hand before actuating said means for controlling.

38. The projector of claim 32, wherein said use of said means for controlling comprises actuating said means for controlling.

39. The projector of claim 32, further comprising means for automatically discontinuing display of said focus assistance element when said means for controlling is no longer in use.

* * * * *

UNITED STATES PATENT AND TRADEMARK OFFICE
CERTIFICATE OF CORRECTION

PATENT NO. : 7,490,942 B2 Page 1 of 1
APPLICATION NO. : 10/997346
DATED : February 17, 2009
INVENTOR(S) : David A. Williams It is certified that error appears in the above-identified patent and that said Letters Patent is hereby corrected as shown below:

In column 6, line 42, in Claim 27, delete "claim 24." and insert -- claim 24, --, therefor.

Signed and Sealed this

Second Day of June, 2009

JOHN DOLL
*Acting Director of the United States Patent and Trademark Office*